Figure 1:
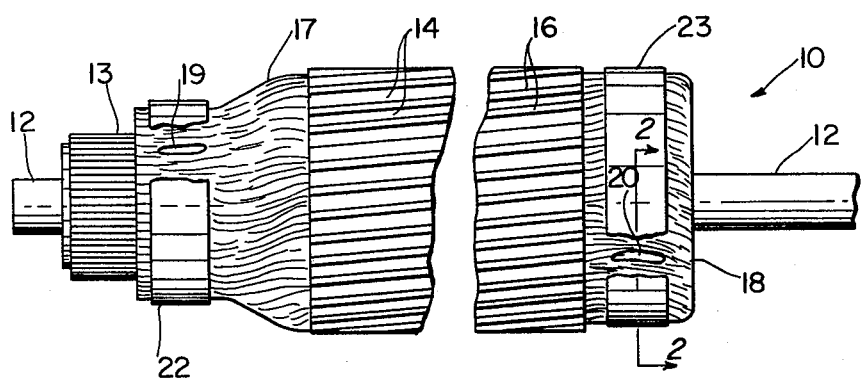

United States Patent [19]

Caramanian

[11] 4,083,735
[45] Apr. 11, 1978

[54] METHOD OF BALANCING ROTORS AND COMPOSITION THEREFOR

[76] Inventor: John A. Caramanian, 1021 Summer St., Cincinnati, Ohio 45204

[21] Appl. No.: 782,570

[22] Filed: Mar. 29, 1977

[51] Int. Cl.² .......................... G01G 5/00; G01M 1/00
[52] U.S. Cl. .......................................... 156/64; 73/66; 79/573 R; 156/330; 260/37 EP
[58] Field of Search ...................... 156/330, 64; 73/66; 79/573 R; 260/37 EP

[56] References Cited

U.S. PATENT DOCUMENTS

| | | | |
|---|---|---|---|
| 3,098,054 | 7/1963 | Rosenberg | 260/37 EP |
| 3,257,342 | 6/1966 | Kwong | 260/37 EP |
| 3,287,303 | 11/1966 | Wagner | 260/37 EP |
| 3,405,102 | 10/1968 | Kugler et al. | 260/37 EP |
| 3,876,606 | 4/1975 | Kehr | 260/37 EP |
| 3,939,020 | 2/1976 | Caramanian | 156/330 |

OTHER PUBLICATIONS

Handbook of Epoxy Resins, Lee & Neville, Copyright 1967.

*Primary Examiner*—Edward G. Whitby
*Attorney, Agent, or Firm*—Edmund M. Jaskiewicz

[57] ABSTRACT

In a method and composition for dynamically balancing rotors and the like, an improved epoxy resin balancing composition is applied to a rotor and the rotor is dynamically tested before the resin is cured. The resin composition includes fibrous inorganic material and a reaction polyamide hardening agent or catalyst. The composition has a specific gravity of at least 3.0.

6 Claims, 3 Drawing Figures

U.S. Patent  April 11, 1978  4,083,735

METHOD OF BALANCING ROTORS AND COMPOSITION THEREFOR

This invention relates to a method and composition for balancing rotors and the like. The present invention constitutes and improvement over that described in U.S. Pat. No. 3,939,020 of Ara Caramanian.

The principal object of this invention is to provide a plastic resinous rotor balancing composition which can be applied onto rotors, spindles, fans and the like and made to firmly adhere thereto at relatively higher peripheral speeds than hereto possible.

A further object of the invention is to provide an improvement in balancing rotors or the like, such as the armatures of motors, fan blades, computer spindles, fillets of inner surfaces and paper rolls.

Another object of this invention is to provide a resinous balancing composition or compound having improved properties and higher specific gravity and slump resistance than heretofore considered possible.

As described in the aforementioned patent, in balancing rotors e.g. spindles, armatures of motors and the like, the rotor is rotated using appropriate dynamic balancing equipment to determine the amount of the balancing composition required and the place or position at which it should be secured to the rotor. After applying a desired amount of the balancing composition to the rotor so that it firmly adheres thereto, the rotor is again rotated and dynamically tested to determine if the balancing is correct and, if not, a portion of the balancing composition is removed, or a further amount of balancing composition added, as required, to balance the rotor. Whereas the rotor balancing epoxy resinous composition of the present invention comprises inorganic fibrous material and high specific gravity material, similarly as that set out in the aforesaid patent, the proportionate amounts of such components are greatly altered. Furthermore, the inclusion of high boiling aromatic diluents, such as heretofore incorporated, has been entirely eliminated from the balancing composition of the present invention. The final product, accordingly, and its use distinguishes materially from the prior art.

The improved characteristic properties provided by the present invention are unique and unexpected compared with the prior art, such as described in the aforementioned patent. Some important distinctions may be enumerated as follows:

(1) The adhesion and cohesion properties are significantly increased whereby larger amounts of the balancing composition can be applied to a rotor during the balancing operation;

(2) Shrinkage of the balancing composition is reduced substantially thus permitting the invention to be used for balancing armatures having finer coils without removing the varnish therefrom;

(3) The specific gravity of the balancing composition is increased from 2.0 to 3.0–3.15 due to the improved composition formula, and such as makes it possible to hold lead or brass in place as an adhesive in cases of extreme imbalance;

(4) Preparation of the balancing materials and mixing of the components is made easy, and addition or subtraction of the materials during balancing is more readily accomplished than heretofore;

(5) The slump temperature is raised to 500° F and above, and the green tack is improved with shelf life extended three years; Likewise the thermal shock range is now 212° to −80° F and;

(6) The di-electric constant is increased to 450 volts per mil.

A preferred balancing composition having the improved characteristic properties set forth comprises two components, one of which contains an epoxy resin and the other containing a catalyst for causing setting of the resin. The components are adapted to be mixed together in equal amounts.

In the following detailed description and examples, all parts and percentages are given by weight.

An example of the balancing components A and B is as follows:

| Component A | |
|---|---|
| 20.23 | parts epoxy resin (Shell Epon 828) |
| 7.44 | fibrous crystalline calcium silicate (Cab-o-lite) |
| 17.44 | zinc powder |
| 8.37 | asbestos fiber |
| 46.52 | powdered barium sulfate |
| 100.00 | parts |

| Component B | |
|---|---|
| 38.57 | parts polyamide resin (Shell V-15) |
| 18.72 | parts fibrous crystalline calcium silicate (Cab-O-lite) |
| 37.45 | powdered barium sulfate |
| 1.15 | tridimethyl amino-methyl phenol |
| 4.11 | asbestos fiber |
| 100.00 | parts |

The epoxy resin of component A can be the commercial product known as Shell Epon 828, a tradename of Shell Oil Company, and has an epoxy base of bisphenol A-epichlorhydrin type having an epoxy equivalent of 185 to 225 and an average molecular weight of 300 to 400. The crystalline calcium silicate can be a naturally occurring fibrous crystalline material known as Cab-o-lite, a tradename of Interspace Corporation. Such material is also known as Wollastonite. Polyamide functions as a hardener and can be a reactive polyamide resin having an amino equivalent of 200 to 300 known as Shell V-15, a tradename product of Shell Oil Company. The polyamide also helps make the balancing composition sticky or tacky and adherent, even in the green state, whereby the composition can be easily affixed to the rotor or spindle being dynamically balanced.

The elimination of diluents, such as the high boiling aromatic solvent heretofore included in the balancing composition, has been found by tests to significantly increase the adhesive property of the composition as well as improve its slumping temperature. This has been raised such that the improved balancing composition can withstand temperatures up to 500° and even 750° F for short periods without slumping, whereas heretofore with the addition of diluents slumping of the balancing composition became a problem at temperatures above room temperature.

Components A and B can be prepared and stored until ready for use. When the components A and B are mixed together a soft plastic mass is produced providing the improved balancing composition. Such a mixed mass consists of:

| | |
|---|---|
| 38.57 | parts Polyamide resin (Shell V-15) |
| 20.23 | parts epoxy resin (Shell Epon 828) |
| 26.16 | parts fibrous crystalline calcium silicate (Cab-o-lite) |
| 17.44 | parts Zinc powder |
| 83.97 | part Powdered barium sulfate |
| 12.48 | parts Asbestos fiber |
| 1.15 | parts Tridimethyl Amino-methyl phenol |

-continued

| 200.00 parts |
| --- |

The balancing composition forms a tacky, sticky mass which readily sticks firmly to rotor or spindle parts and is easy to handle and manipulate as pieces or plastic lumpy masses. During use portions of the balancing composition can be secured at appropriate places on the rotor or spindle during balancing the same and adheres strongly thereto. After attaching portions of the composition, the rotor is rotated to determine if the balancing has been properly accomplished. As deemed necessary portions of the balancing composition are removed or additional portions added onto the rotor. Thereafter the rotor is then dynamically tested again to determine of the balancing is correct, if not, addition or removal of some of the balancing composition is repeated until the rotor is properly balanced.

Figure 2:
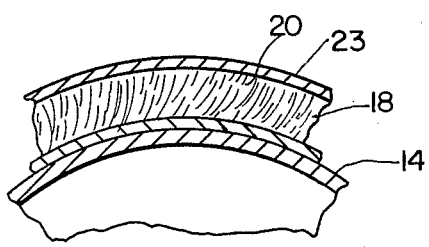
Figure 3:
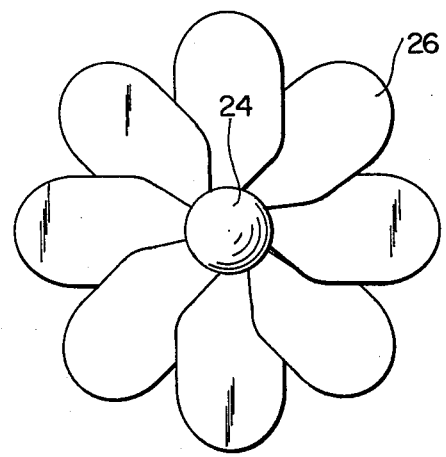

The above improvements as explained, and other features of the invention will become apparent from the following detailed description and the drawing, in which:

FIG. 1 is an elevation view of an armature, partly broken away, and including added portions of the improved balancing composition of this invention; and FIG. 2 is a fragmentary view in section taken on an enlarged scale on Line 2—2 in FIG. 1, the outer wrapping being shown in full lines; and In FIG. 3 illustrates diagramatically a fan having the blades dynamically balanced in accordance with this invention.

In the following detailed description and drawings, like reference characters indicate like parts.

In FIG. 1 there is shown an armature or rotor 10 for an electric motor which includes a shaft 12 on which a commutator assembly 13 and a core 14 are mounted. Armature coils 16 are mounted in slots in the core. End parts 17 of the coils extend from one end of the core to the commutator assembly. Loop parts 18 of the coils extend from the opposite end of the core. The armature is mounted in an appropriate dynamic balancing equipment, not shown, and is tested to determine the mass and positioning of balancing weight required. Suitable portions 19 and 20 of the balancing composition are secured to the end sections of the coils as required to balance the armature or rotor.

After attaching the composition, the armature is again rotated in the balancing equipment to determine if further adjustments are required. The balancing composition, described in the example, is tacky and strongly adheres to the armature parts and remains sufficiently cohesive even before curing of the composition so it does not tend to separate from itself or the rotor during rotation and dynamically balancing of the same. The improved balancing composition stays in position on the rotor at higher rotational speeds than prior balancing compositions, withstanding a peripheral rotational speed of 64 ft. per second with rotors of seven inches diameter at 1820 r.p.m.

When balancing of the rotor or armature is completed, the rotor is removed and the end portions 17 and 18 are wrapped with strips of pressure-sensitive glass fiber tape 22 and 23 which lock the coils in position and overlie the masses of balancing composition. Thereafter varnish may be applied to the armature, as by dipping, and the thus treated armature heated for about 20 minutes at a temperature e.g. 200° F, or sufficient to dry or cure the varnish. Utilizing the balancing composition of the present invention it has been found, as aforementioned, that it can be used on finer armature coils and without removing varnish already applied thereto. Likewise varnish may be applied, if desired, either before or after the balancing operation. Furthermore, the balancing composition of this invention will cure at ordinary room temperature e.g. 70° F. The application of heat merely accelerates the cure desired. In the balancing of fan blades, such as shown in FIG. 3, the composition, as at 24 is applied to one or more of the fan blades 26 and after balancing, curing the resinous composition similarly as described for armatures and spindles.

The fibrous crystalline calcium silicate, asbestos fibers give the balancing composition improved wet strength and reinforcement such that it does not tend to separate from itself as explained during high speed rotational balancing treatment. Barium sulfate and zinc powder are included to built up the weight of the composition. Sufficient powdered zinc is added to inhibit corrosion of underlying surfaces, being insufficient to render the composition electrically conductive. For easier preparation of the balancing composition Components A and B may be mixed together in equal volumes instead of by weight.

Excellent results are obtained using the improved balancing composition of this invention where the composition comprises approximately 10 percent epoxy resin, 13 percent fibrous crystalline calcium silicate, 9 percent powdered zinc, 6 percent asbestos fiber, 42 percent powdered barium sulfate and 19 percent polyamide resin, the remainder being a hardening and curing agent.

Various hardeners, or mixtures thereof, may be used as well as tridimethyl aminomethyl phenol e.g. dimethyl aminomethyl phenol. Also diethylene triamine, triethylene tetramine, liquid and solid aliphatic and aromatic amines and amido amines, and which cure the epoxy resin at room temperature (70°–72° F). Such epoxy resin hardeners are available commercially.

When it is desired, the dynamic balancing composition may be provided as a single can or container type, eliminating the need of mixing two components e.g. (A) and (B) as described. In such a single component system, the mixture, containing the resultant mixture including the hardener or curing agent is stored at low temperature e.g. below 40° F preferably about 0° F prior to use. This low-temperature-storage avoids pre-curing of the epoxy resinous mass before it is ready to use. The composition may preferably comprise a hardener which requires a heat cure instead of a hardener which cures the resin at room temperature. An example of such a hardener is boron trifluoride which produces a heat cure when the balancing composition is heated from 93° to 177° C for 20 minutes to an hour, the proportioned amount of hardener, by weight, per 100 parts epoxy resin being from 1 to 5 parts. Dry powdered phthalic anhydride likewise may be used as a hardener; The anhydride preferably being pre-heated to about 120° to 140° C at a ratio of 75 parts per hundred by weight of epoxy resin, the resin having an epoxide equivalent weight of 180 to 195. The phthalic anhydride curing action may be accelerated with the addition of 0.1% per hundred by weight of benzol diethylmethylamine. The curing and hardening schedule for such a single can system is 3 hours at 120° C with a post cure of 4 hours at 150° C.

It will be understood that this invention is susceptible to modification in order to adapt it to different usages and conditions, and accordingly, it is desired to comprehend such modifications within this invention as may fall within the scope of the appended claims.

What is claimed is:

1. A method of balancing a rotor or the like which comprises applying to the rotor a balancing composition which consists essentially of approximately 10 percent by weight of an epichlorhydrin-bisphenol A epoxy resin, 19 percent of a fibrous inorganic material, 51 percent of powdered weighting material selected from the group consisting of a powdered zinc and powdered barium sulfate, 19 percent of a reactive polyamide having an amido equivalent of 200 to 300, and a catalyst, the composition having a specific gravity of at least 3.0 and having substantially no slump at 500° F temperature the composition being sufficiently tacky, adherent, and cohesive to adhere to the rotor during dynamic testing before curing, dynamically testing the rotor with the balancing composition in position thereon, adjusting the amount of the balancing composition on the rotor to achieve balance, and then curing the resin.

2. A method of balancing a rotor or the like which comprises applying to the rotor a balancing composition which consists essentially of approximately 10 percent by weight of an epichlorhydrin A epoxy resin, 19 percent of a fibrous inorganic material, 51 percent of powdered weighting material selected from the group consisting of a powdered zinc and powdered barium sulfate, 19 percent of a reactive polyamide having an amono equivalent of 200 to 300 and a catalyst, the composition having a specific gravity of at least 3.0 and having substantially no slump at 500° F temperature, the composition being sufficiently tacky, adherent, cohesive to adhere to the rotor and remain dimensionally stable during dynamic testing before curing, dynamically testing the rotor with the balancing composition dimensionally stable in position thereon, adjusting the amount of the balancing composition on the rotor to achieve balance, and then curing the resin.

3. A method of balancing a rotor in accordance with claim 2 wherein the amount and position of the balancing composition is adjusted and dynamic testing of the rotor repeated until the desired degree of balance is attained before the resin is cured.

4. A method of balancing a rotor or the like which comprises applying to the rotor an epoxy resin balancing composition having a specific gravity of at least 3.0 and having substantially no slump at a temperature of 500° F, the composition being sufficiently tacky, adherent, and cohesive, to adhere to the rotor and remain dimensionally stable during dynamic testing before curing, dynamically testing the rotor with the balancing composition dimensionally stable in position thereon, and curing the resin.

5. A method of balancing a rotor or the like which comprises applying to the rotor an epoxy resin balancing composition having a specific gravity of at least 3.0 and having substantially no slump at a temperature of 500° F, the composition being sufficiently tacky, adherent, and cohesive to adhere to the rotor and remain dimensionally stable during dynamic testing before curing, dynamically testing the rotor with the balancing composition dimensionally stable in position thereon, adjusting the amount and position of balancing composition and dynamically retesting the rotor until the desired degree of balance is attained, and curing the resin.

6. A method of balancing a rotor or the like in accordance with claim 5 wherein the balancing composition consists essentially of approximately 10 percent by weight of an epichlorhydrin-bisphenol A epoxy resin, 19 percent of a fibrous inorganic material, 51 percent of powdered weighting material selected from the group consisting of a powdered zinc and powdered barium sulfate, 19 percent of a reactive polyamide having an amino equivalent of 200 to 300 and an epoxy resin hardener.

* * * * *

UNITED STATES PATENT AND TRADEMARK OFFICE
CERTIFICATE OF CORRECTION

PATENT NO. : 4,083,735
DATED : April 11, 1978
INVENTOR(S) : John A. Caramanian

It is certified that error appears in the above—identified patent and that said Letters Patent is hereby corrected as shown below:

The term of this patent subsequent to February 17, 1983, has been disclaimed.

Signed and Sealed this

Twenty-eighth Day of October 1980

[SEAL]

Attest:

SIDNEY A. DIAMOND

Attesting Officer

Commissioner of Patents and Trademarks